3,415,770
POLYVINYL CHLORIDE PLASTICIZED WITH MIXED ALKYL TERPENE DIBASIC ACID ESTERS

William J. Cunningham, Holland, Pa., assignor to Rohm and Haas Company, Philadelphia, Pa., a corporation of Delaware
No Drawing. Continuation-in-part of application Ser. No. 398,107, Sept. 25, 1964, now Patent No. 3,342,852. This application June 29, 1967, Ser. No. 649,813
8 Claims. (Cl. 260—29.8)

ABSTRACT OF THE DISCLOSURE

A plasticized polyvinyl chloride composition made from polyvinyl chloride and a plasticizer consisting of a mixed alkyl terpene ester of a dibasic acid or an alkyl half terpene ester of a dibasic acid.

---

This is a continuation-in-part of my U.S. application Ser. No. 398,107 which was filed on Sept. 25, 1964 and issued as U.S. Patent 3,342,852 on Sept. 19, 1967. Application Ser. No. 398,107 in turn was a continuation-in-part of U.S. application Ser. No. 327,864 filed on Nov. 18, 1963 and since abandoned.

This invention concerns plastic compositions comprising polyvinyl chloride which has been plasticized with an ester of a dibasic acid. More particularly, it concerns platic compositions which have been plasticized with an ester prepared by reacting a dibasic acid or alkyl half ester thereof with a terpene.

It has been discovered that mixed alkyl terpene esters of dibasic acids, a detailed description of which is to be found in parent application Ser. No. 398,107, are highly effective plasticizers for polyvinyl chloride (PVC) and typical formulations and test data thereon are presented hereinafter. These esters, as a class, are characterized by low volatility, i.e., good permanence, good compatibility as indicated by excellent resistance to high humidity spew, and good light stability, and the PVC compositions plasticized therewith are very resistant to staining.

It has been found that the introduction of the terpenyl group into the molecule markedly improves its compatibility with polyvinyl chloride. For instance, didecyl adipate, as the sole plasticizer in a PVC composition, spews excessively; in other words, it is substantially incompatible. However, decylisobornyl adipate, substantially the same molecular weight, is very compatible and shows no spew over prolonged periods of time.

A large number of alkyl terpene esters of dibasic acids can be employed as the PVC plasticizers of the present invention. Typical of them and among those which are preferred are the alkyl terpene esters of adipic acid, phthalic acid (generally used as the anhydride), glutaric acid, sebacic acid, suberic acid, ethyl suberic acid, pimelic acid, azelaic acid, terephthalic acid, isophthalic acid, dimethyl adipic acid, dodecanedioc acid, and mixtures thereof.

In order to control or change the propeties of the plasticizers, it is frequently desirable to use a mixed ester, i.e., one having two different ester groups on the same dibasic acid backbone. Such mixed esters make it possible to control such properties as compatibility, volatility, and stability to ultraviolet light.

Mixed alkyl or alkoxyethyl terpene esters are preferred as plasticizers for PVC. The alkyl group can range from $C_2$ to $C_{18}$, with the particularly preferred range being from $C_4$ to $C_{15}$. It is generally preferred to use a product formed by reacting the alkyl half ester with the terpene. Typical of the alkyl and alkoxy groups in the esters are the following: n-propyl, n-butyl, isobutyl, isoamyl, n-hexyl, isohexyl, 2-ethylhexyl, octyl, isooctyl (Oxo process), isodecyl, n-decyl, lauryl stearyl, and n-butoxy, isobutoxy, n-hexyloxy, isohexyloxy, n-octyloxy, and isooctyloxy.

The plasticizers which are combined with PVC in the present invention may be represented by the general formula

in which R is an organic radical, $R^1$ is selected from the group consisting of alkyl and alkoxyethyl $C_2$ to $C_{18}$, and
$R^2$ is a terpenyl radical.

Obviously, such a formula covers the diterpenyl ester as well as the alkyl or alkoxy terpenyl esters, which are the preferred plasticizers for PVC. R, an organic radical, contains only carbon and hydrogen, and it is necessary so to designate it as an "organic radical" since it includes aliphatic and aromatic radicals. The carbon atom content of this organic radical does not exceed 20.

Using the macroreticular resins as catalysts, a wide variety of terpenes can be added to dibasic acids or their half acid esters to form the PVC plasticizers of the present invention. Typical of such terpenes are limonene, pinene, fenchene, camphene and phellandrene. The turpentines provide an excellent economical source of terpenes, and either gum- or steam-distilled turpentine can be used. The turpentines are not pure terpenes, but the nonterpene portion does not adversely affect the reaction and is removed by distillation along with the excess terpene which is normally employed.

EXAMPLES

The esters described above, particularly the alkyl and alkoxyethyl terpene diesters, are, as set forth hereinbefore, very efficient plasticizers for polyvinyl chloride. Four typical formulations involving Plasticizer A, octyl isobornyl phthalate (Example 1), Plasticizer B, n-butyl isobornyl phthalate (Example 2), Plasticizer C, n-butoxyethyl isobornyl phthalate (Example 3), and Plasticizer D, n-hexyloxyethyl isobornyl phthalate (Example 4), are as follows: Plasticizers were incorporated in formulations comprising 60% polyvinyl chloride resin with 40% plasticizer and 1% of a cadmium/barium stabilizer, the components in each case being simply mixed and blended together. The results of the tests on these compositions are shown in Table I:

TABLE I

| | Plasticizer A | Plasticizer B | Plasticizer C | Plasticizer D |
|---|---|---|---|---|
| Shore "A" hardness, 10 sec | 78 | 80 | 75 | 81 |
| Tf=135,000, °C | −3 | +7 | −8 | −21 |
| A/C volatility, 24 hrs./90° C | 3.0 | 9.0 | 4.5 | 3.5 |
| Percent soap extraction, 24 hrs./90° C | 7.0 | 13.5 | 17.7 | 16.6 |
| n-Hexane extraction, 2 hrs./RT | 25.0 | 16.5 | 16.9 | 19.6 |
| Atreol No. 9 extraction 10 days/RT | 4.0 | 0 | 0.7 | 1.9 |
| Quantitative compatibility | 0 | 0 | 0 | 0.1 |
| Heat stability, hrs./350° F | ¼–2 | ¼–2 | 1–2 | 1–2 |
| Fadeometer stability, hrs. to fail | 300 | 400 | 620 | 855 |
| 60° high humidity spew | (¹) | (¹) | (¹) | (¹) |

¹ >150 days (dry).
NOTES.—Tf=modulus of elasticity; A/C=activated carbon.

The formulations shown in the preceding paragraph are standard test formulas frequently employed for screening new products for their plasticizing properties and should not be construed as limiting the ratio of the plasticizers to polyvinyl chloride. They may be employed at low levels of the order of 5% to give stocks which are substantially rigid. Even at such low levels of use, processing of the polyvinyl chloride is improved, and some toughness is imparted to the stock. As is apparent from the four examples given, they may be used at appreciably higher levels and, as is well known to those skilled in the art, the plasticizer content is generally determined on the basis of the application for which the stock is intended. Stocks containing as high as 60% plasticizer can be used.

I claim:

1. A plastic composition comprising polyvinyl chloride plus a plasticizer which is an ester having the formula

in which R is an organic radical containing only carbon and hydrogen with a maximum carbon atom content of 20, $R^1$ is selected from the group consisting of $C_2$ to $C_{18}$ alkyl, $C_2$ to $C_{18}$ alkoxyethyl and terpenyl radicals, and $R^2$ is a terpenyl radical, the terpenyl radicals being selected from the group consisting of limonene, pinene, fenchene, camphene and phellandrene.

2. A composition as set forth in claim 1 in which the ester concentration is from 5 to 60% of the total composition.

3. A plastic composition as set forth in claim 2 in which the ester plasticizer is octyl isobornyl phthalate.

4. A plastic composition as set forth in claim 2 in which the ester plasticizer is n-butyl isobornyl phthalate.

5. A plastic composition as set forth in claim 2 in which the ester plasticizer is isoamyl isobornyl phthalate.

6. A plastic composition as set forth in claim 2 in which the ester plasticizer is diisobornyl adipate.

7. A plastic composition as set forth in claim 2 in which the ester plasticizer is n-butoxyethyl isobornyl phthalate.

8. A plastic composition as set forth in claim 2 in which the ester plasticizer is n-hexyloxyethyl isobornyl phthalate.

References Cited

UNITED STATES PATENTS 3,210,311  10/1965  Brownell et al. _____ 260—29.8
3,224,995  12/1965  De Pree _____ 260—31.8

MORRIS LIEBMAN, *Primary Examiner.*

L. T. JACOBS, *Assistant Examiner.*

U.S. Cl. X.R.

260—31.8, 31.4